US009045230B2

(12) United States Patent
Burrows et al.

(10) Patent No.: US 9,045,230 B2
(45) Date of Patent: Jun. 2, 2015

(54) LAVATORY MONUMENT ASSEMBLY

(71) Applicant: C&D ZODIAC, INC., Huntington Beach, CA (US)

(72) Inventors: Ralph Burrows, Bellingham, WA (US); Christoph Goeschel, Seattle, WA (US); John Higgins, Bellingham, WA (US); Thomas Lee, Coto de Caza, CA (US); Herman Schotte, Hamburg (DE); Scott Savian, Huntington Beach, CA (US); Ian G. Scoley, Huntington Beach, CA (US)

(73) Assignee: C&D Zodiac, Inc., Huntington Beach, CA (US)

( * ) Notice: Subject to any disclaimer, the term of this patent is extended or adjusted under 35 U.S.C. 154(b) by 289 days.

(21) Appl. No.: 13/765,612

(22) Filed: Feb. 12, 2013

(65) Prior Publication Data

US 2013/0206906 A1  Aug. 15, 2013

Related U.S. Application Data

(60) Provisional application No. 61/598,762, filed on Feb. 14, 2012.

(51) Int. Cl.
*B64D 11/02* (2006.01)
(52) U.S. Cl.
CPC ...................... *B64D 11/02* (2013.01)
(58) Field of Classification Search
CPC . B64D 11/02; B64D 11/2011; B64D 11/0046
See application file for complete search history.

(56) References Cited

U.S. PATENT DOCUMENTS

| 4,884,767 A | 12/1989 | Shibata |
| 6,079,669 A * | 6/2000 | Hanay et al. ............... 244/118.5 |
| 7,284,287 B2 | 10/2007 | Cooper |

(Continued)

FOREIGN PATENT DOCUMENTS

| EP | 0290477 | 11/1988 |
| EP | 0349762 | 1/1990 |

OTHER PUBLICATIONS

International Search Report and Written Opinion from related PCT/US2013/025974 application.

*Primary Examiner* — Philip J Bonzell
*Assistant Examiner* — Nicholas McFall
(74) *Attorney, Agent, or Firm* — Jeffer Mangels Butler & Mitchell LLP; Brennan C. Swain, Esq.

(57) ABSTRACT

A lavatory monument assembly configured to be positioned in the interior of an aircraft that includes a first wall and a second wall that are generally parallel to one another, and the second wall is longer than the first wall. The lavatory monument assembly further includes a third wall and a fourth wall, and the third wall and the fourth wall generally are perpendicular to the first wall and the second wall, and the third wall and the fourth wall connect to the first wall and the second wall to form a lavatory interior. The first portion of the fourth wall generally is parallel to the third wall, and a second portion of the fourth wall angles inwardly along generally straight lines into the lavatory interior, such that the area in the lavatory interior proximate the first wall is less than the area proximate the second wall. The lavatory monument assembly farther includes a toilet in the lavatory interior proximate the first wall, and it further includes a door positioned on one of the first, second, third, or fourth walls.

15 Claims, 6 Drawing Sheets

(56) References Cited

U.S. PATENT DOCUMENTS

| | | |
|---|---|---|
| 7,299,511 B2 | 11/2007 | Quan |
| 7,549,606 B2 | 6/2009 | Quan |
| 2002/0062521 A1* | 5/2002 | Itakura .............................. 4/664 |
| 2004/0123381 A1 | 7/2004 | Kitade |
| 2004/0163170 A1* | 8/2004 | Cooper et al. .................... 4/664 |
| 2004/0227034 A1 | 11/2004 | Wentland |
| 2005/0116099 A1 | 6/2005 | Pho |
| 2011/0011979 A1* | 1/2011 | Weil et al. ................. 244/122 R |
| 2012/0001270 A1 | 1/2012 | Ehlers |

* cited by examiner

LAVATORY MONUMENT ASSEMBLY

CROSS REFERENCE TO RELATED APPLICATIONS

This application claims the benefit of U.S. Provisional Application No. 61/598,762, filed Feb. 14, 2012, which is herein incorporated by reference in its entirety.

FIELD OF THE INVENTION

The present invention relates generally to aircraft lavatories and more particularly to a lavatory with a recessed flight attendant seat.

BACKGROUND OF THE INVENTION

Commercial aircraft, such as the Airbus A320 or Boeing 737, are typically constructed from modular components, the size, weight and construction of which are dictated by many considerations, including fuselage dimensions, aesthetic and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include lavatories for use by passengers and crew.

A typical lavatory has a rectangular footprint, a toilet, and a sink. It usually also has four composite panel walls that may be molded to fit the curvature of the plane, and a ceiling with built in lighting. The lavatory monument is secured to the aircraft via various tie-rods and brackets, and is designed to independently to conform to FAA loading standards. Lavatories have been a standard monument on commercial aircraft for decades. Additionally, the commercial aircraft industry requires five-point harness seats for flight attendants during taxi, takeoff, and landing procedures.

Flight attendant seats aft of the wings are often mounted to the aft wall of monuments (such as lavatories) forward of the aft doors. The standard design of the flight attendant seat includes a flip-down seat flap that deploys during use, and is folded up at other times.

With the prior art, monument-mounted flight attendant seat configuration, the aft wall of the lawn (or other monument) is generally up to a foot forward of rear exit aisles. This allows the flight attendant seat to clear the exit aisle when mounted to the lavatory. As a result, space that could be allocated for passenger seats is occupied by the lavatories (or other monuments), which results in a non-optimal layout for many aircraft.

SUMMARY OF THE PREFERRED EMBODIMENTS

In accordance with an aspect of the present invention there is provided a lavatory monument assembly configured to be positioned in the interior of an aircraft that includes a first wall and a second wall that are generally parallel to one another, and the second wall is longer than the first wall. The lavatory monument assembly further includes a third wall and a fourth wall, and the third wall and the fourth wall generally are perpendicular to the first wall and the second wall, and the third wall and the fourth wall connect to the first wall and the second wall to form a lavatory interior. The first portion of the fourth wall generally is parallel to the third wall, and a second portion of the fourth wall angles inwardly along generally straight lines into the lavatory interior, such that the area in the lavatory interior proximate the first wall is less than the area proximate the second wall. The lavatory monument assembly further includes a toilet in the lavatory interior proximate the first wall, and it further includes a door positioned on one of the first, second, third, or fourth walls. In a preferred embodiment, the lavatory monument assembly further includes a sink, and preferably, the first wall is generally parallel and adjacent to an interior aircraft wall when the lavatory monument assembly is placed proximate an aircraft exit door. Preferably, lavatory monument is placed proximate a row of at least two aircraft seats. Preferably, the second portion of the fourth wall angles inwardly at about 90 degrees with respect to the first portion of the fourth wall to form a compartment proximate the second wall, and the second portion of the fourth wall further connects to a third portion of the fourth wall that is generally parallel to the third wall and that connects to the first wall. The sink is positioned in the compartment. In a preferred embodiment, the second portion of the fourth wall curves inwardly along a generally curved line instead of angling inwardly along generally straight lines, and preferably, the lavatory monument assembly further comprises at least one recessed seat on the fourth wall, proximate the second wall. Preferably, the toilet defines a vertical plane that bifurcates the toilet, and the toilet is positioned such that the vertical plane is not parallel to the third wall.

In accordance with another aspect of the present invention there is provided an aircraft with a cabin having a side wall that includes at least one exit door, wherein the exit door includes an exit corridor adjacent thereto. The aircraft also includes a lavatory monument assembly positioned within the cabin, wherein the lavatory monument assembly includes a first wall and a second wall, and the first wall generally is parallel to the second wall, and the second wall is longer than the first wall. The lavatory monument assembly also includes a third wall and a fourth wall, and the third wall and the fourth wall generally are perpendicular to the first wall and the second wall. The third wall and the fourth wall connect to the first wall and the second wall to form a lavatory interior, undo first portion of the fourth wall generally is parallel to the third wall, and a second portion of the fourth wall angles inwardly along generally straight lines into the lavatory interior, such that the area in the lavatory interior proximate the first wall is less than the area proximate the second wall. The lavatory monument assembly also includes a toilet in the lavatory interior proximate the first wall, and it includes a door positioned on one of the first, second, third, or fourth walls. In a preferred embodiment, the lavatory monument assembly further includes a sink. Preferably, the second portion of the fourth wall angles inwardly at about 90 degrees with respect to the first portion of the fourth wall to form a compartment proximate the second wall, and the second portion of the fourth wall further connects to a third portion of the fourth wall that generally is parallel to the third wall and that connects to the first wall. The sink is positioned in the compartment. Preferably, the lavatory monument assembly is positioned proximate the exit door, and the third portion of the fourth wall defines a portion of the exit corridor. Preferably, the lavatory monument assembly is placed proximate a row of at least two aircraft seats. In a preferred embodiment, the second portion of the fourth wall curves inwardly along a generally curved line instead of angling inwardly along generally straight lines, and preferably, the lavatory monument assembly further includes at least one recessed seat on the fourth wall, proximate the second wall. Preferably, the toilet defines a vertical plane that bifurcates the toilet, and the toilet is positioned such that the vertical plane is not parallel to the third wall. Preferably, the lavatory monument assembly is positioned proximate the exit door, and the third portion of the fourth wall defines a portion of the exit corridor.

In accordance with another aspect of the present invention there is provided a lavatory monument assembly configured to be positioned in the interior of an aircraft that includes a first wall and a second wall, the first wall being generally parallel to the second wall, and a third wall and a fourth wall, the third wall and the fourth wall being generally perpendicular to the first wall and the second wall. The third wall and the fourth wall connect to the first wall and the second wall to form a lavatory interior. The lavatory monument assembly also includes a door positioned on one of the first, second, third, or fourth walls, and an opening on the fourth side, proximate the second side, wherein a movable seat assembly is fitted therethrough. The seat assembly is movable between a recessed position where at least a portion of the seat assembly extends into the lavatory interior and an extended position where at least a portion of the seat assembly is positioned outside the lavatory interior. In a preferred embodiment, the seat assembly includes a frame that includes a seat back and a pivotal seat operatively associated therewith. When the lavatory assembly is placed proximate an aircraft exit door that defines an exit corridor, the seat assembly extends into the exit corridor in the extended position and does not extend into the exit corridor the recessed position.

DETAILED DESCRIPTION OF THE PREFERRED EMBODIMENTS

Figure 1:
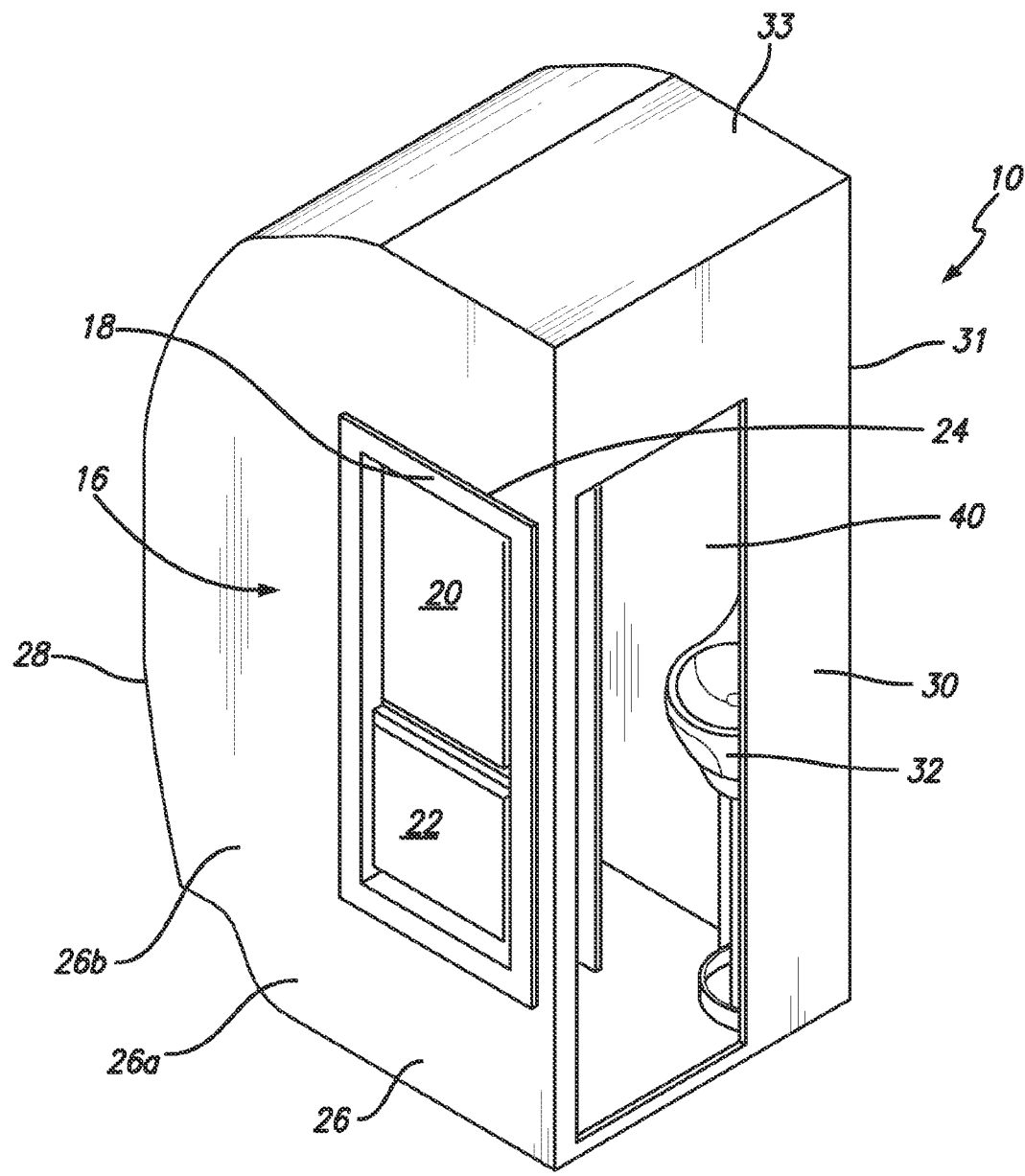
FIG. 1 is a perspective view of a lavatory monument assembly with a recessed flight attendant seat assembly showing the flight attendant seat assembly in the recessed position.
Figure 2:
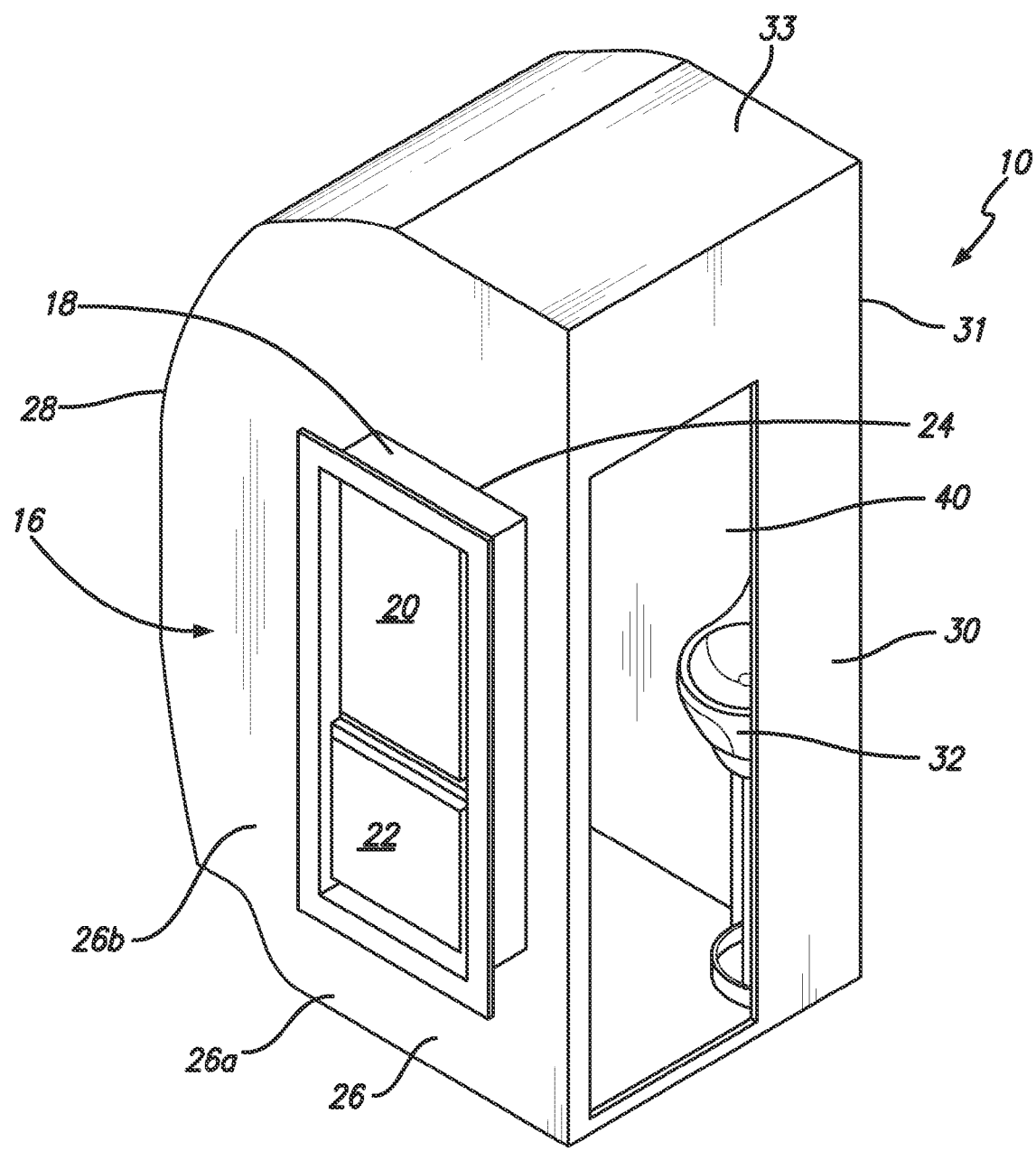
FIG. 2 is a perspective view of the lavatory monument assembly of FIG. 1 showing the flight attendant seat assembly in the extended position.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but are not necessarily, references to the same embodiment; and, such references are intended to refer to at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to one of skill in the art regarding the description of the disclosure. For convenience, certain terms may be highlighted, for example using italics and/or quotation marks. The use of any such highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long" "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-4 show an aircraft lavatory monument assembly 10 that provides an angled toilet 12 orientation, a generally V-shaped passenger footprint 14, one or more recessed flight attendant seats and seat assemblies 16, and a door 40. Only one flight attendant seat per seat assembly 16 is shown in the figures, but the inclusion of multiple flight attendant seats within each seat assembly is within the scope of the present invention.

Figure 3A:
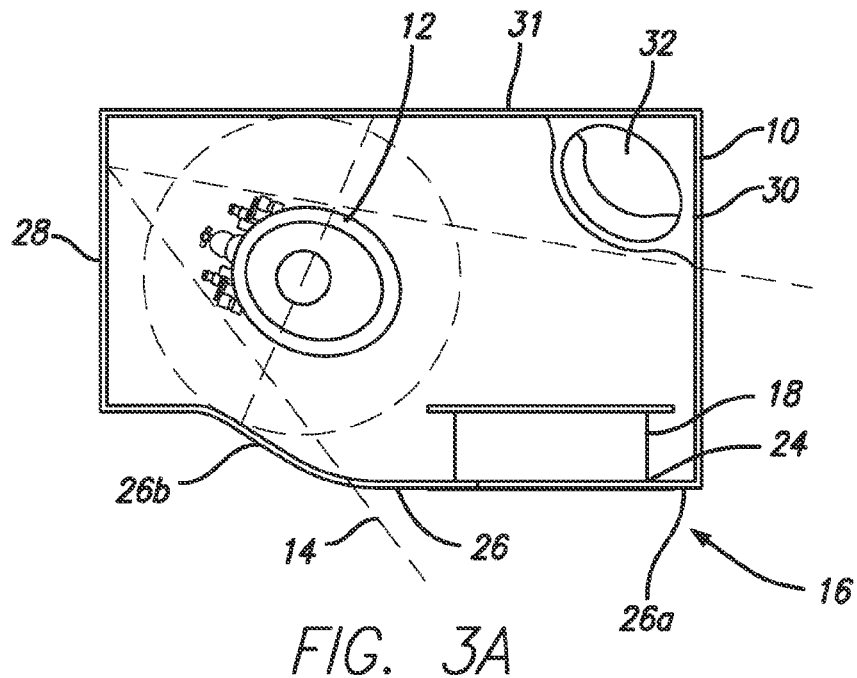
FIG. 3A is a top plan view of the lavatory monument assembly of FIG. 1 in accordance with a preferred embodiment of the present invention and showing the flight attendant seat assembly in the recessed position.

In a preferred embodiment, the lavatory monument assembly includes first wall 28, second wall 30, third wall 31 and fourth wall 26 (as well as ceiling 33, which can be omitted). In a preferred embodiment, the flight attendant seat assembly 16 includes at least a frame 18, seat back 20 and pivotal seat 22. The frame 18 is received in an opening 24 in a fourth wall 26 of the lavatory monument assembly 10. As shown in FIGS. 1 and 3A, in the recessed position, the seat assembly 16 extends into the lavatory space. In this position, the lavatory can still be used, but the space is limited. In the extended position show FIGS. 2 and 3B, the seat assembly 16 extends outwardly from the fourth wall 26 and takes up little to no space in the lavatory.

In an exemplary use, the flight attendant seat assembly 16 is recessed into the lavatory fourth wall 26 for use during taxi, takeoff, and landing procedures, and is pulled outwardly to the extended position during flight. The flight attendant seat assembly 16 can be moved or actuated manually or mechanically, with electric actuators or by other methods known to those of ordinary skill in the art. The pivotal seat 22 can be pivoted downwardly for use in either the recessed or extended position. Therefore, the flight attendants can use the seat in any position.

Figure 3B:
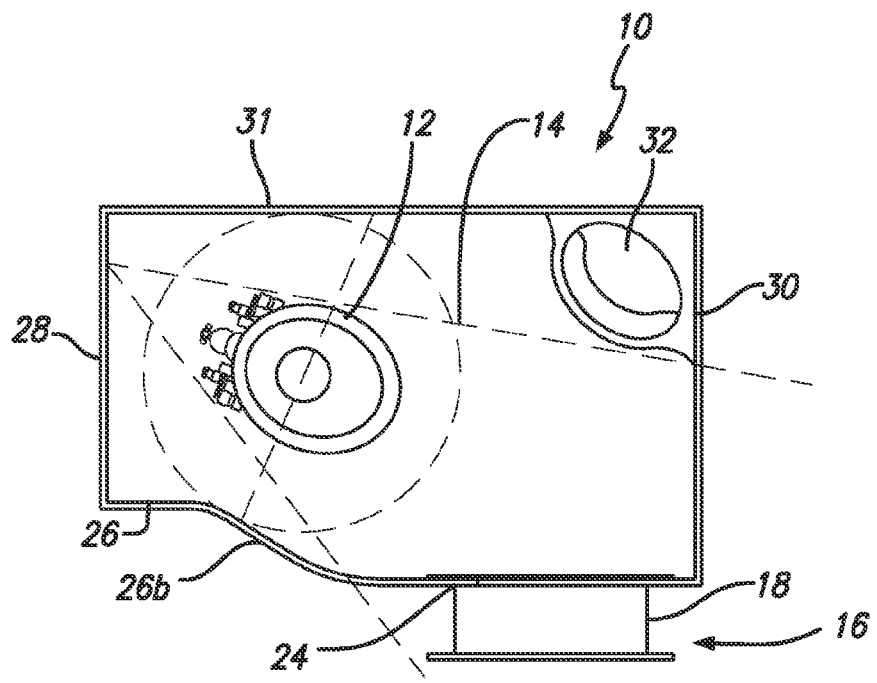
FIG. 3B is a top plan view of the lavatory monument assembly of FIG. 3A showing the flight attendant seat assembly in the extended position.
Figure 4:
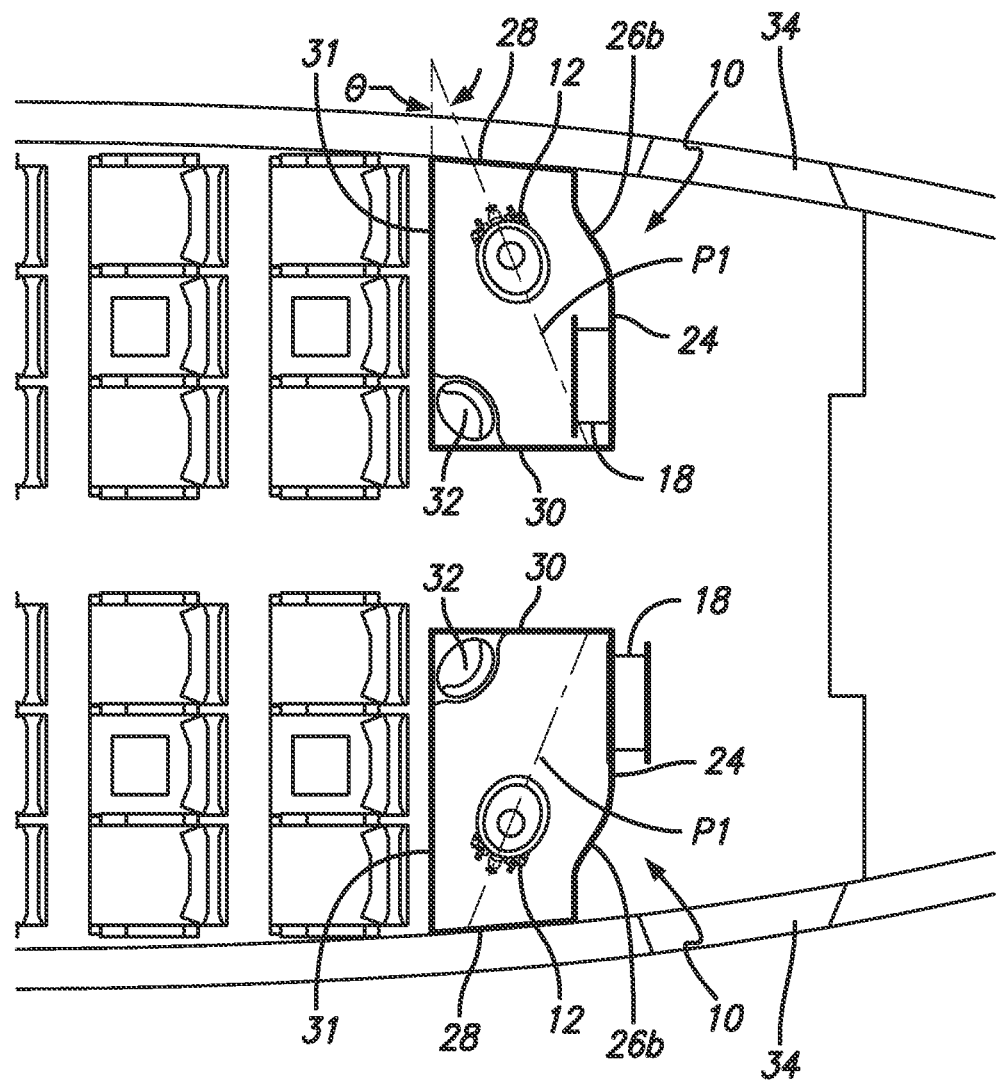
FIG. 4 is a top plan view of a potential layout within an aircraft of the lavatory monument assembly shown in FIG. 1, including the lavatory monument assembly position with respect to aircraft exits.

As shown in FIGS. 1-4 and 5B, in a preferred embodiment, fourth wall 26 includes a first portion 26a and a second portion 26b that is curved. In other words, in this embodiment, the lavatory monument assembly 10 does not have a rectangular footprint. As can be seen in FIGS. 3A, 3B, 4, and 5B, the toilet defines a vertical plane P1 that bifurcates the toilet, and the toilet is positioned such that the vertical plane P1 is not parallel to at least the third wall 31 (see FIG. 4 and angle θ). The angled toilet 12 orientation and generally V-shaped passenger footprint (see FIGS. 3A and 3B showing the V-shaped passenger footprint), allow for increased comfort in a smaller footprint lavatory when compared to the prior art. This is achieved by having the minimum lavatory width in the rear of the toilet (see first wall 28), and having broader dimensions in front of the toilet (see second wall 30), as shown in FIGS. 3A and 3B and in another preferred embodiment depicted in FIG. 6. Prior art lavatory monuments generally have a rectangular footprint. The increased passenger footprint can also be achieved by providing a toilet 12 that is positioned such that it is angled, as is best shown in FIGS. 3A-3B. In other words, the toilet 12 is angled such that a vertical plane that bifurcates the toilet 12 is non-parallel to and forms an angle with the forward wall of the lavatory monument assembly (when positioned as shown in FIG. 4). This allows a passenger seated on the toilet 12 to use the extra space created by the curved fourth wall 26. However, this is not a limitation on the present invention, and the toilet can be positioned such that it faces straight inboard, as is known in the prior art. Additionally, space occupied by the recessed flight attendant seat assembly 16 is vacated and made available to the lavatory when the seat assembly 16 is in the extended position during flight. FIG. 4 shows a potential layout plan of the lavatory monument assembly 10, as described above, within an aircraft.

Figure 5A:
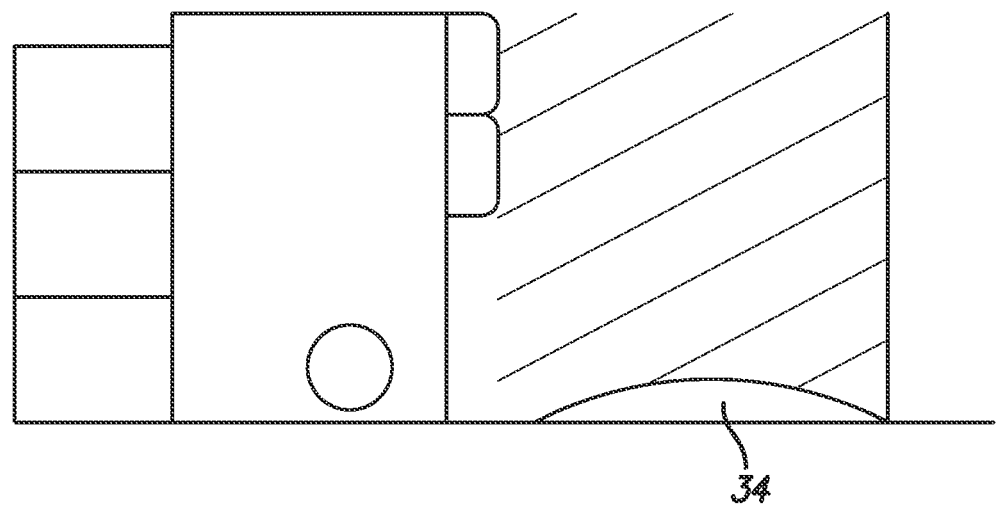
FIG. 5A is a top plan view of a prior art standard aircraft lavatory and exit space.
Figure 5B:
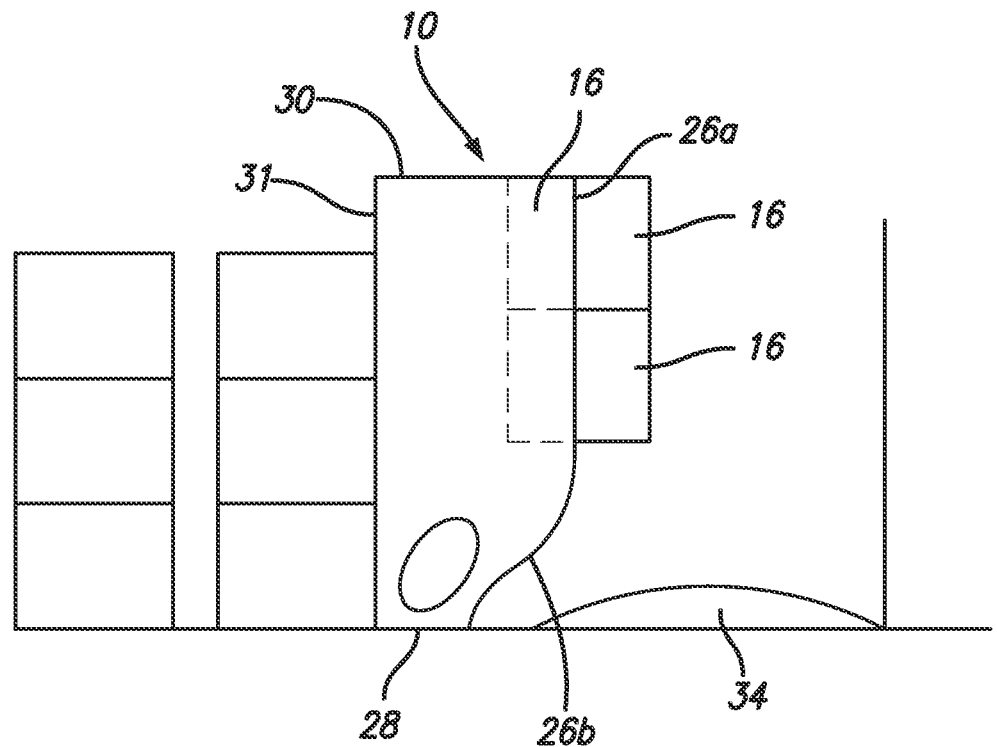
FIG. 5B is a top plan view of the same aircraft as FIG. 5A with the inventive lavatory monument assembly installed therein, and an extra row of seats added as a result.

FIGS. 5A and 5B compare a standard prior art lavatory monument to the lavatory monument assembly 10 of the present invention and show the possible space savings and ability for an airline to add a row or more of seats, while providing sufficient space in front of exit door 34 for ingress and egress in compliance with applicable FAA regulations. As show FIG. 5A, a standard lavatory monument includes two flight attendant seats on an aft wall thereof and typically has 30" of exit space between the flight attendant seats and the wall (or row of seats or other object) aft thereof. However, FAA regulations only require 20" of exit space. 30" is usually provided because moving the lavatory 10" aft does not provide enough space for a new row of seats. None of the dimensions discussed herein are intended to be a limitation on the present invention.

As shown in FIG. 5B with the arrangement of the present invention lavatory monument assembly 10, 20" of exit space if provided between the aft wall of the lavatory monument assembly 10 and the wall (or row of seats or other object) aft thereof. With the second portion 26b footprint of the lavatory monument assembly 10, the entire lavatory monument assembly 10 can be positioned aft of where the prior art lavatory monument was positioned. As is shown in FIG. 5A, the second portion 26b allows fourth wall 26 to curve around the exit door. By positioning the lavatory monument assembly 10 aft of where the prior art monument is positioned and reducing the exit space from 30" to 20", an extra row of seats can be added.

In another embodiment, fourth wall 26 can be straight. Essentially, this embodiment is a prior art lavatory with the seat assembly 16 associated therewith.

In the present invention, the flight attendant seat can occupy emergency exit space when lavatory space is required, and lavatory space when emergency exit space is required. This also allows for a lavatory where the aft wall can be flush against the emergency exit row limits (however, this is not a limitation). As a result, aircraft may be able to fit additional seats, thereby gaining revenue, increased seat pitches, or additional monuments forward of the lavatory. FIG. 4 illustrates a possible layout of the lavatory monument assembly in an aircraft, including the lavatory monument assembly with respect to aircraft exits 34, showing the intended space saving results that can be achieved in accordance with the present invention.

The recessed flight attendant seat assembly 16 can also be applied to other aircraft monuments, including but not limited to galleys, closets, wind-screens, and class dividers, if space allocation can be easily swapped between the flight attendant seat and monument during flight.

Figure 6:
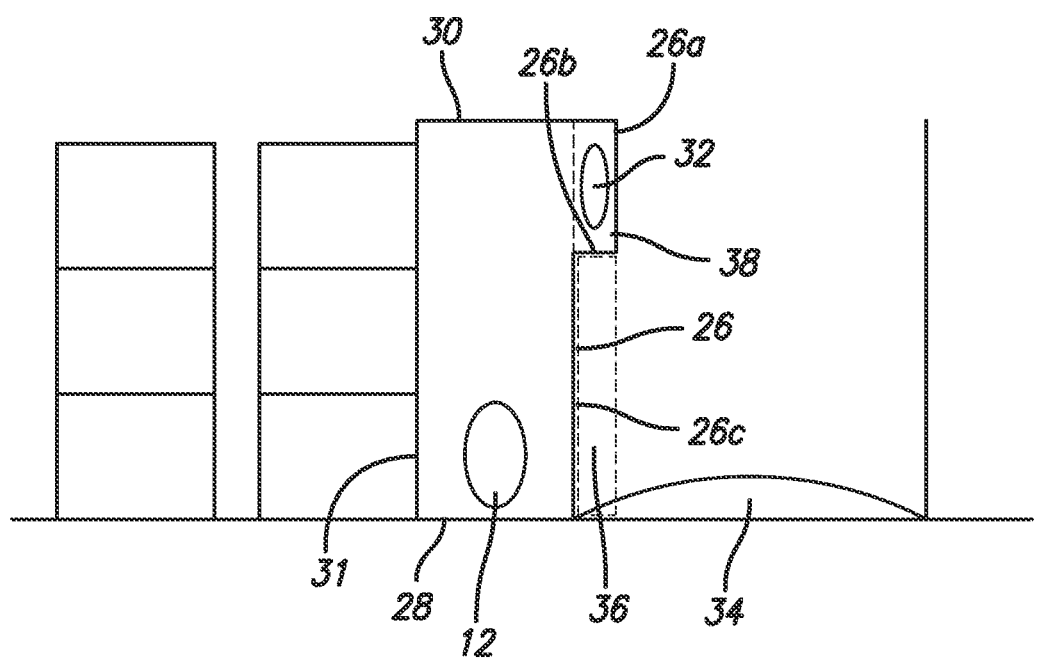
FIG. 6 is a top plan view of a lavatory monument assembly in accordance with another preferred embodiment of the present invention.

In another preferred embodiment shown in FIG. 6, the additional space achieved by having the minimum lavatory width in the rear of the toilet (see first wall 28), and having broader dimensions in front of the toilet (see second wall 30) (as shown in FIGS. 3A and 3B, and as can also be seen in FIG. 6), can be used for other fixtures other than, or in addition to, the recessed seats shown in FIGS. 1 through 5B. For example, as shown in FIG. 6, the additional space that is achieved can be used for creating a compartment 38 that can include a fixture or component therein. In a preferred embodiment, a sink 32 is positioned in compartment 38. However, this is not a limitation on the present invention. Placement of the sink 32 in this position may be desirable in some embodiments of the present invention because it allows additional passenger room in the lavatory in the area immediately in front of the toilet 12. And, as described above, placement of sink 32 in this position is possible due to the overall broader dimensions of second wall 30 as compared to first wall 28. Furthermore, by positioning the sink 32 in compartment 38, shoulder room is preserved in the area immediately around the toilet 12. It is contemplated and intended that the preferred embodiment depicted in FIG. 6 include a door positioned on one of the walls of the lavatory, monument assembly, similar or identical to the door 40 depicted in FIGS. 1 and 2. As shown in FIG. 6, in a preferred embodiment, fourth wall 26 includes first portion 26a, second portion 26b and third portion 26c. First portion 26a, second portion 26b and a portion of second wall 30 cooperate to define compartment 30. In a preferred embodiment, sink 32 is positioned within compartment 30 such that the sink and any related components (e.g., drain, cabinet, mirror, etc.) are all positioned with the compartment 30. In other words, a plane that extends from the inside surface of third portion 26c of wall 26 does not extend through sink 32.

FIG. 6 also shows the flight attendant assist space 36 that is required on most aircraft. FIG. 6 shows that the assist space 36 is preserved by positioning the compartment 38 inboard of first wall 28 and the exit 34. This allows the lavatory monument assembly 10 to be positioned as aft as possible (when in the back of an aircraft) to maximize seating. The curved wall discussed above provides the same advantage.

In the preferred embodiment shown in FIG. 6, the space immediately in front of the exit of the aircraft is sufficient under FAA regulations, similar or identical to the space in front of the exit of the aircraft shown in the embodiment depicted in FIG. 5B. While the walls of the preferred embodiment are depicted in FIG. 6 as being generally straight in the plan view, and not curved, it is contemplated that they could be curved in a ma er shown in FIGS. 3A, 3B, and 5B, and such embodiments are intended to be within the scope of the present invention. Where the walls comprising compartment 38 are depicted in FIG. 6 as being generally at right angles, it is contemplated and intended that the angles of the walls used to form compartment 38 could range anywhere from 0 to 90 degrees. Moreover, while FIG. 6 is a plan view depicting generally straight lines for the walls of the lavatory monument assembly, it is contemplated and intended that the walls, when depicted in a perspective view, need not necessarily be along straight lines in the vertical, but alternatively can be shaped according to the interior of the aircraft or other factors and considerations commonly known to those of skill in the art (as can be seen, for example, and not by way of limitation), in the perspective views of the lavatory monument assembly shown in FIGS. 1 and 2). Those of ordinary skill in the art should understand that the claim language referring to parallel and perpendicular and the like refers to the plan view of the lavatory monument assembly and any aircraft LOPA in which it is positioned.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "below," and words of similar import, used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples; alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet farther embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will include the words "means for.") Accordingly, the applicant reserves the right to add additional claims after filing the application to pursue such additional claim forms for other aspects of the disclosure.

Although exemplary embodiments of invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A lavatory monument assembly configured to be positioned in the interior of an aircraft, the lavatory monument assembly comprising:
   a first wall and a second wall, the first wall being generally parallel to the second wall, and the second wall being longer than the first wall;
   a third wall and a fourth wall, the third wall being generally perpendicular to the first wall and the second wall, the third wall and the fourth wall connecting to the first wall and the second wall to form an enclosure that defines a lavatory interior, the fourth wall including first, second and third portions, the first and third portions of the fourth wall being generally parallel to the third wall, wherein the second portion of the fourth wall extends between and is generally perpendicular to the first and third portions, such that the area in the lavatory interior proximate the first wall is less than the area proximate the second wall, and wherein a compartment is defined between the second portion of the fourth wall and the second wall;

a toilet in the lavatory interior proximate the first wall;

a door positioned on one of the first, second, third, or fourth walls; and a sink positioned in the compartment.

2. The lavatory monument assembly of claim 1 wherein an assist space is defined exterior to the third portion of the fourth wall, and wherein the assist space is not within the lavatory interior.

3. The lavatory monument assembly of claim 2, wherein when the lavatory monument assembly is placed proximate an aircraft exit door, the first wall is generally parallel and adjacent to an interior aircraft wall, and the second portion of the fourth wall is not perpendicular to the aircraft wall.

4. The lavatory monument assembly of claim 3, wherein the lavatory monument assembly is placed proximate a row of at least two aircraft seats.

5. The lavatory monument assembly of claim 4, wherein when the lavatory monument assembly is placed proximate an aircraft exit door the assist space at least partially overlaps with an exit corridor defined by the aircraft exit door and the compartment is positioned at least partially within the exit corridor.

6. The lavatory monument assembly of claim 1, wherein the door is positioned on the second wall.

7. The lavatory monument assembly of claim 1, wherein the door is positioned on the third wall.

8. The lavatory monument assembly of claim 1, wherein the toilet defines a vertical plane that bifurcates the toilet, wherein the toilet is positioned such that the vertical plane is parallel to the third wall.

9. An aircraft comprising:
a cabin having a side wall that includes at least one exit door, wherein the exit door includes an exit corridor adjacent thereto; and
a lavatory monument assembly positioned within the cabin, wherein the lavatory monument assembly comprises (i) a first wall and a second wall, the first wall being generally parallel to the second wall, and the second wall being longer than the first wall, (ii) a third wall and a fourth wall, the third wall and the fourth wall connecting to the first wall and the second wall to form an enclosure that defines a lavatory interior, the fourth wall including first, second and third portions, the first and third portions of the fourth wall being generally perpendicular to the second wall, wherein the second portion of the fourth wall extends between and is generally perpendicular to the first and third portions, such that the area in the lavatory interior proximate the first wall is less than the area proximate the second wall, and wherein a compartment is defined between the second portion of the fourth wall and the second wall, (iii) a toilet in the lavatory interior proximate the first wall, and (iv) a door positioned on one of the first, second, third, or fourth walls, and (v) a sink positioned in the compartment.

10. The aircraft of claim 9, wherein an assist space is defined exterior to the third portion of the fourth wall, and wherein the assist space is not within the lavatory interior.

11. The aircraft of claim 10, wherein the lavatory monument assembly is positioned proximate the exit door, and wherein the third portion of the fourth wall defines a portion of the exit corridor, and wherein the assist space at least partially overlaps with the exit corridor and the compartment is positioned at least partially within the exit corridor.

12. The aircraft of claim 11, wherein the third wall of the lavatory monument assembly is placed proximate a row of at least two aircraft seats.

13. The aircraft of claim 9, wherein the door is positioned on the first wall.

14. The aircraft of claim 9, wherein the door is positioned on the third wall.

15. The aircraft of claim 9, wherein the toilet defines a vertical plane that bifurcates the toilet, wherein the toilet is positioned such that the vertical plane is not parallel to the first portion of the fourth wall.

* * * * *